United States Patent [19]

Phillips

[11] Patent Number: 4,845,616
[45] Date of Patent: Jul. 4, 1989

[54] METHOD FOR EXTRACTING ACOUSTIC VELOCITIES IN A WELL BOREHOLE

[75] Inventor: William E. Phillips, Houston, Tex.

[73] Assignee: Halliburton Logging Services, Inc., Houston, Tex.

[21] Appl. No.: 83,140

[22] Filed: Aug. 10, 1987

[51] Int. Cl.$^4$ ............................................. G01V 1/40
[52] U.S. Cl. ..................................... 364/422; 367/26; 367/27
[58] Field of Search ..................... 364/422; 367/26, 27

[56] References Cited

U.S. PATENT DOCUMENTS

| | | | |
|---|---|---|---|
| 4,223,398 | 9/1980 | Blalock | 369/27 |
| 4,346,460 | 8/1982 | Schuster | 367/27 |
| 4,460,986 | 7/1984 | Millovet et al. | 367/27 |
| 4,535,625 | 8/1985 | Lyle, Jr. | 364/422 |
| 4,677,596 | 6/1987 | Lyle, Jr. et al. | 364/422 |
| 4,683,557 | 7/1987 | Willis | 367/27 |
| 4,684,947 | 8/1987 | Zimmer | 364/422 |

Primary Examiner—A. D. Pellinen
Assistant Examiner—Jeffrey A. Gaffin
Attorney, Agent, or Firm—William J. Beard

[57] ABSTRACT

In an acoustic well logging apparatus including one or two transmitters and having a pair of spaced apart receivers, two interval transit times are measured independently through a common zone of interest. The two independent measured values are then compared and the difference is then used in contrast with a threshold determinant based on the period of the transmitted pulses. This comparison shows a difference. If the threshold value is not exceeded by the difference value a quality indication is then obtained suggesting that the acoustic measurements did not suffer from cycle skipping. If the threshold value is exceeded by the difference value, then a possible cycle skip exists. If testing shows that a cycle skip does exist, then the error that it introduces is removed from the final log, and a quality indication is obtained suggesting that the answer is good and that a cycle skip error has been removed.

12 Claims, 2 Drawing Sheets

FIG. 2A   FIG. 2B   FIG. 2C
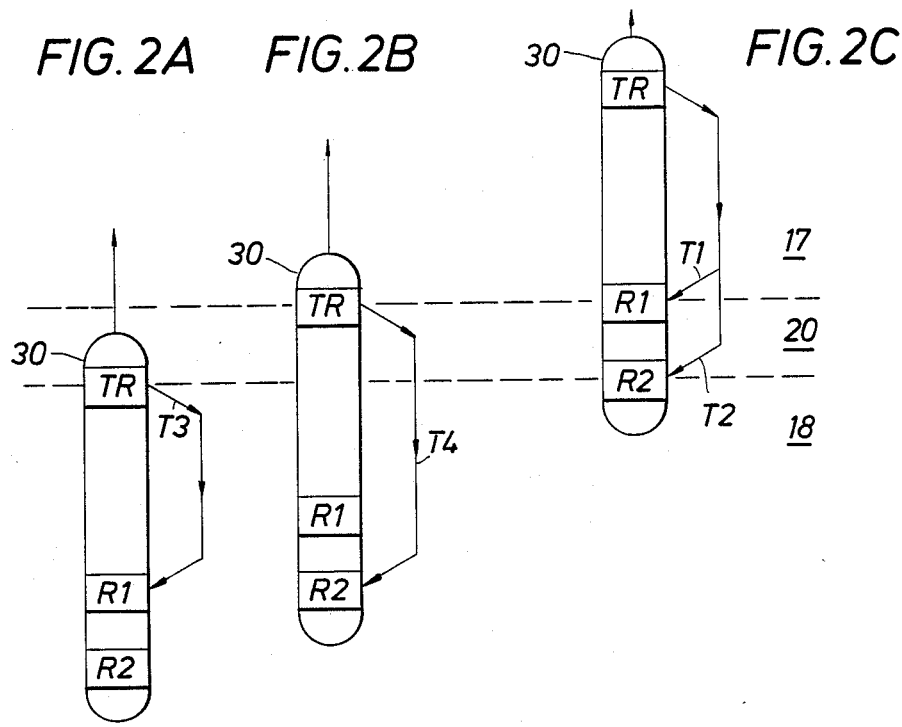
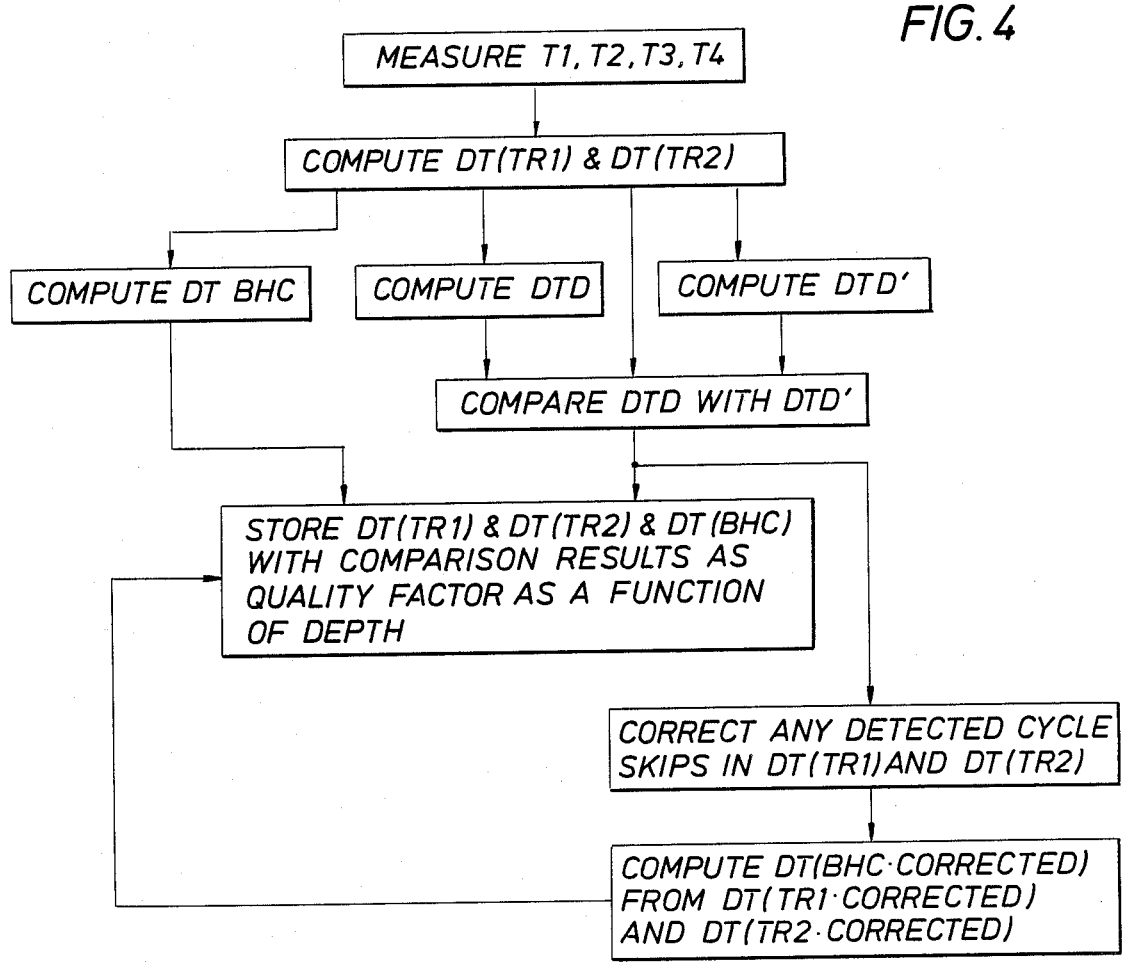
FIG. 4

METHOD FOR EXTRACTING ACOUSTIC VELOCITIES IN A WELL BOREHOLE

BACKGROUND OF THE DISCLOSURE

An acoustic logging tool transmits an acoustic pulse from a sonde supported transmitter to one or more receivers on the sonde. The pulse that is transmitted includes a number of cycles of acoustic energy. The travel path is in the vicinity of the well borehole and generally parallel to the sonde. The transmitted pulse is several cycles of an appropriate frequency for transmission in earth formations in the vicinity of the well borehole. At the receiver, there being one or more, the transmitted pulse is observed, and one aspect of receiving the acoustic pulse is to detect the various zero crossings which occur. Generally, the wave form of the transmitted pulse is more or less preserved at the receiver albeit subject to some measure of attenuation. The received pulse needs to be recognized at a particular portion of onset of the transmitted pulse. The measured transit time thus depends on starting measuring at a particular point in the transmitted pulse ending with a corresponding and similar point in the received pulse.

There is the possibility of jitter in transmission time dependent on whether or not the received pulse is measured at the proper instant. This depends on whether or not the particular zero crossing of the received acoustic pulse is recognized by the receiver circuitry. It is important to locate and recognize zero crossings. Zero crossing refers to the AC signal in the pulse crossing some reference, typically a zero reference, and counting to that zero crossing as the necessary reference. Cycle skipping is a problem in acoustic well logging. Cycle skipping refers to identification of an incorrect zero crossing event in the received acoustic pulse. Assume for easy description that the transmitted acoustic pulse has precisely ten cycles. Assume further that the very first cycle is a fully developed wave form. This defines a very sharp reference point in the transmitted pulse. At the receiver, if that particular zero crossing is observed, then there will be no error arising from cycle skipping. If, however, there is some loss of the first cycle (as for instance a failure to recognize the first cycle) at the receiver, then cycle skipping will occur where the receiver identifies the later cycles and affiliated zero crossings. In view of the relative short spacing and the relative rapid transit time, one cycle error can be a significant difference in acoustic transmission time.

This problem is magnified significantly when using long spaced tools because there is inherent additional attenuation of the acoustic signal along the longer travel path. The received signal must be amplified significantly. Even when amplified, it may be difficult to pick out the particular zero crossing event which corresponds with the particular event in the transmitted pulse. Thus, cycle skipping occurs in short transmission paths but is more likely for longer transmission paths. The method and apparatus of the present disclosure are directed to a system whereby the received acoustic pulse is evaluated to determine whether or not cycle skipping has occurred, and to improve the data which is obtained. The present apparatus and procedure are useful with different types of acoustic measuring devices. There are some systems which use two transmitters and other systems which use only one. The present disclosure accommodates both types of acoustic measuring devices.

The performance of an acoustic logging system is in part reported by describing the independent interval transit time, a factor known as Delta T. For a given interval to be acoustically tested and evaluated, the present system contemplates obtaining more than one Delta T measurement for that interval. In other words, two or more independent measurements are made. When the two values of Delta T are obtained by means of independent measurements, if a comparison is obtained, some indication of quality data is thereby derived. It is possible therefore to evaluate the logged data even where there are extremely high velocity contrasts between adjacent beds. In other words, there are certain geological formations which may show extremely high contrast between adjacent data on a curve of acoustic measurements. Sometimes, such recorded events may be wrongly rejected as possible cycle skips. It is very difficult to distinguish errors in the Delta T measurement as a result of cycle skipping without resort to the present invention. Another important factor is to create a quality factor which will indicate improved confidence in the acoustic log over an interval of interest on the log. If the quality factor is high, then it is assured that the data is the highest quality data which can be obtained. Even in the worst case situation, the quality factor still indicates that in some degree the obtained acoustic log is useful. Moreover, the present invention enables a procedure of eliminating the erroneous zero crossing events. In other words, data of such erroneous crossing events can be located and identified. If it is identified, it is then known that the data is of less than desirable quality. The foregoing is accomplished by construction of an important factor which will be described as the Delta T Discriminant, hereinafter DTD. In the preferred embodiment of the present system, it is ideally carried out by means of a computer which is provided with a program as described in the flow chart found herein, all for the purpose of providing substantially real time data evaluation in the operation of an acoustic log system. As mentioned above, it is adapted for use with both one and two transmitter systems.

DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 shows different positions of a single transmitter acoustic logging tool for illustrating the various propagation paths;

FIG. 4 is a flow chart of a computer program for use in evaluation of acoustic logging data to provide an improved acoustic log.

DETAILED DESCRIPTION OF THE PREFERRED EMBODIMENT

Figures 1, 3:
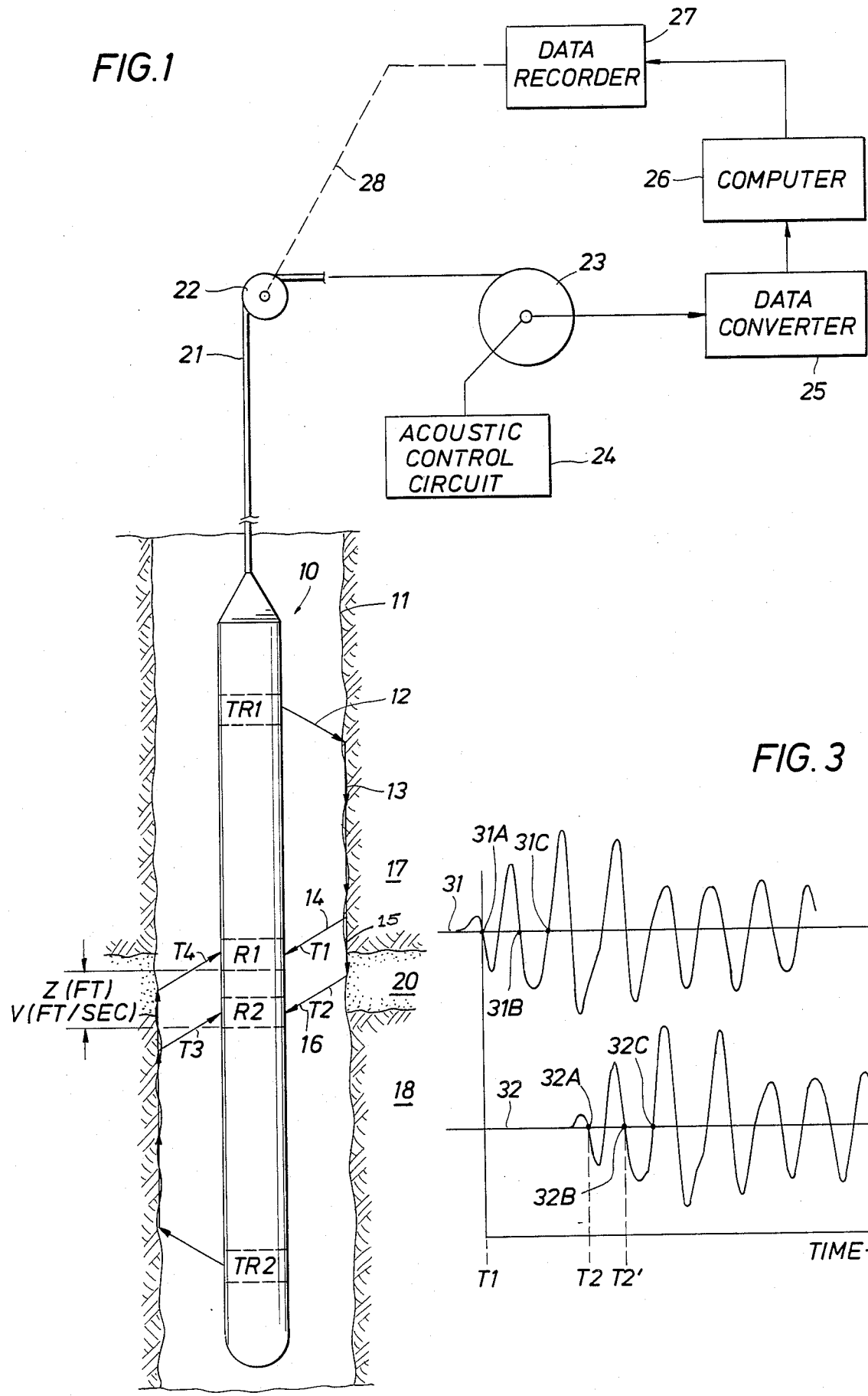
FIG. 1 shows an acoustic logging tool suspended in a well borehole for making acoustic measurements and further includes propagation paths for acoustic pulse transmission.
FIG. 3 shows an acoustic pulse receiver output from a near receiver and far receiver which shows the relative difficulty in determining the proper zero crossings to thereby determine interval transit time.

In FIG. 1 of the drawings, an acoustic logging tool 10 is supported in a well borehole 11 for making acoustic logs. The sonde which comprises the outer shell of the structure encloses a first transmitter which is identified at TR1. The transmitter TR1 forms and transmits an acoustic pulse which travels along a path segment 12 and which then travels along another segment 13. The last segment 14 shows how the propagation path is directed back to the sonde 10. There, a receiver R1 receives the transmitted signal. In summary, the propagation path is represented in somewhat of an idealized fashion to include straight line segments 12, 13 and 14 in FIG. 1. As will be understood, this is something of an idealized pathway, it being understood that the propagation path travels out of the sonde and into the adjacent formation. The graphic representation utilizing straight line segments is understood by those of average skill in the art to represent a system for easy analysis. Of course, actual measurements fairly well bear out that this approximation with straight line segments is acceptable.

The transmitter TR1 communicates along the additional straight line segment portions 15 and 16 to a second receiver identified at R2. As will be understood, this is a longer propagation path and encounters more attenuation. For purposes of identification for subsequent development, the propagation path between TR1 and R1 is identified as T1, and the similar but longer pathway to the second receiver R2 is identified as T2.

In similar fashion, the sonde incorporates and supports a second transmitter which is identified at TR2. It is shown transmitting acoustic pulses along similar pathways to the same receivers. As before, individual propagation pathways are labeled T3 and T4. Additional factors known about the sonde include known distances between the receivers which are represented by the distances Z. Various velocities along the tool 10 in the adjacent formations are represented by various average velocities V. Distances Z and velocities V are described with various subscripts to separate the particular measurements in issue. Another important factor is that the receivers R1 and R2 are spaced apart for measurement of interval transit time across a particular formation 20. The formations may have any thickness, and dip is not important to the acoustic measurements herein described. The formation 20 is the region or area to be measured and is to be contrasted with adjacent formations 17 and 18. As will be understood, the several formations may differ in thickness and material. It is important however, to utilize the acoustic logging device of the present invention to obtain interval transit time or Delta T across the region 20. The region 20 may be a portion of a larger formation.

The present apparatus is adapted to be suspended on an armored logging cable 21 which supports the sonde 10 in the well borehole 11. It extends to the surface and passes over a sheave 22. The cable 21 is spooled on a drum 23. The cable connects with an acoustic control circuit 24 which provides appropriate power and operating signals to the sonde 10. In addition, the armored logging cable 21 provides output data through one or more conductors which are connected to a data converter 25. The data is placed in suitable format and then is conveyed to a computer 26. The computer 26 is provided with a suitable program of instructions for processing the acoustic logging data described hereinafter, and is also equipped with sufficient memory to carry out real time data processing. The output of the computer is provided to a data recorder 27. The data recorder 27 is connected by means of an electronic or mechanical measuring device 28 which is connected with the sheave 22 and which provides depth of the sonde 10 in the well borehole 11 so that the logged data can be correlated to the depth in the well. In other words, the acoustic data that is obtained from the present apparatus is put in a suitable format for presentation as a function of depth in the well borehole.

In the foregoing system, the sonde 10 supports two transmitters and two receivers. To that extent, the four signal propagation paths defined in FIG. 1 are also important to the analysis developed below. FIG. 2 however, shows a single transmitter system. FIG. 2 includes FIG. 2A where a single transmitter system is shown supported in a sonde 30. The sonde 30 is again shown with the propagation path T3 illustrated and extending from the single transmitter. FIG. 2B shows the sonde 30 after movement. Again, there is a propagation path which is associated with FIG. 2B. FIG. 2C shows the sonde 30 after further movement. The positions shown in the three views are developed relative to a particular formation or interval 20. Again, this interval is the interval to be tested and measured. While the sonde has three different positions, there are four signal paths developed in FIG. 2. As will be observed, these four signal paths correspond to the four signal paths developed in FIG. 1. The difference primarily results in the fact that the single transmitter sonde 30 must be moved to alternate positions. However, the transmission paths developed in FIG. 2 are shown with regard to the interval 20 which is the interval to be measured.

From the foregoing, it will be observed that the two different systems (one transmitter versus two transmitters) can both be used to make the acoustic measurements to be described.

Attention is now directed to FIG. 3 of the drawings. Recall that, in theory, an idealized square envelope acoustic pulse is transmitted. Again, this must be recognized as the idealized form of the transmitted pulse. As a result of the inherent rise time in the acoustic transmitter, and the necessary damping of the signal during travel, the received signal is not so sharply defined. Moreover, it is difficult to locate the exactly corresponding zero crossing events. In FIG. 3 of the drawings, the numeral 31 identifies a received signal at the near receiver while the signal wave form for the far receiver is illustrated at 32. The far received signal is later because it is farther from the transmitter. Some time shift has occurred as a result of this. It is assumed, however, that the two signals are amplified to approximate equal amplitudes. Even so, it is again difficult to locate the precise crossing events. As represented in the time shifted received signals, common events are shown at 31A and 32A. Those represent negative going zero crossing events. Similar subsequent crossing events are shown at 31B and 32B. Positive going crossing events are shown at 31C and 32C. Such crossing events are easily shown in the graphic representation of FIG. 3, but in dynamic circumstances, it may be somewhat difficult to precisely know the correlation of the various crossing events in the two received signals. In fact, it might be easy to confuse crossing event 32B as corresponding with the crossing event 31A.

The term "picks" will be used to conveniently describe zero crossing events in the received signals. Thus, the several picks shown in FIG. 3 include events at 31A, 31B and 31C from the near receiver. Others obviously exist and can be defined conveniently. A cycle skip occurs when a pick is not recognized. Assume as an easy example that the pick 32A is simply missed, and the pick at 32B is treated as the pick 32A. In that event, one whole cycle has been skipped, and the interval transit time has been distorted by such error in observation.

INTERVAL TRANSIT TIME DESCRIPTION

Referring to FIG. 1 of the drawings, the definitions incorporated in this view will be helpful to describe interval transit time or Delta T. It is particularly important to observe that Delta T is determined in the region 20. There are four specific measurements used, these being T1, T2, T3 and T4. With this in view, it will be observed that the top transmitter TR1 generates the acoustic pulses which are used to form the measurements T1 and T2. Recall further that the interval transit time is normally expressed in microseconds per foot, the reciprocal of velocity. To this end, the first definition relates the Delta T or interval transit time to the measurements of T2 and T1 and is given by:

EQUATION 1:

$$DT(TR1) = (T2 - T1)(1/Z)$$

In the foregoing equation, the dimension Z is the vertical spacing between the receivers R1 and R2. Applying Snell's law to the theoretical travel time difference for the pulse from TR1, one then obtains the same interval time as the sum of two terms, one being the inverse function of velocity and the other being the inverse function of VW or velocity in mud.

EQUATION 2:

$$DT(TR1) = 10^6(1/V) + 10^6(1/VW)(A2 - A1)(1/Z)(\cos\phi)$$

where A2 and A1 are the borehole diameters at R2 and R1 respectively. While the foregoing relates to the Delta T associated with TR1, the second transmitter generates an acoustic pulse which is measured at the two receivers to provide time measurements T3 and T4. This is given in Equation 3.

EQUATION 3:

$$DT(TR2) = (T4 - T3)(1/Z)$$

As before, in applying Snell's law in like fashion, Equation 4 is then obtained:

EQUATION 4:

$$DT(TR2) = 10^6(1/V) - 10^6(1/VW)(A2 - A1)(1/Z)(\cos\phi)$$

Equation 2 is of the form $A + B$ and Equation 4 is of the form $A - B$. Thus, if Equations 2 and 4 are added together, the second terms in each equation drop out so that the results are substantially independent of variations in borehole diameter. Thus, one obtains Equation 5 where the Delta T is for the compensated borehole or BHC. Equation 5 is:

EQUATION 5:

$$DT(BHC) = (DT(TR1) + DT(TR2))/2$$

As observed, Equation 5 is obtained by adding Equations 2 and 4 while Equation 6 is obtained by subtracting Equation 4 from Equation 2.

EQUATION 6:

$$DT(TR1) - DT(TR2) = 2 \times 10^6(1/VW)(A2 - A1)(1/Z)\cos\phi$$

Equation 7 leads to the definition of the Delta T discriminant, symbolized as DTD. Equation 7 is thus given by one half the absolute value found in Equation 6 or:

EQUATION 7:

$$DTD = \tfrac{1}{2}[DT(TR1) - DT(TR2)] = 10^6(1/VW)(A2 - A1)(1/Z)(\cos\phi)$$

The Delta T discriminant or the function DTD from Equation 7 has several useful properties. First of all, it is sensitive to borehole diameter difference variation as suggested by the absolute value of the diameter $A2 - A1$. In the event that DTD is less than the minimum error that can arise as a result of a single cycle skip on either of the Delta T measurements, then one of the following two statements must be true, but both are never simultaneously true:

(1) The two Delta T's are both correct and therefore do not contain cycle skip errors; or (2) The two Delta T's both have identical cycle skip errors.

Another important conclusion is the DTD may possibly be larger than the minimum error that occurs as a result of a single cycle skip in one of the calculations without a cycle skip occurring in either of the two.

Elaborating on the foregoing, it would be observed that a caliper placed in the hole will provide measurements of hole diameter. The DTD value will track the absolute difference in diameters at the two receivers as shown by the differential caliper. This shows a measure of sensitivity of DTD to borehole deviation.

More importantly, DTD, when smaller than a known threshold value, suggests that the Delta T measurements obtained from T1, T2, T3 and T4 are correct. Another strong possibility indicated by a DTD larger than the minimum error and that one would normally anticipate as a result of a single cycle skip possibly indicates a large borehole deviation. In other words, a large DTD may be indicative of borehole deviation without cycle skip. When this occurs, this indicates that further testing of the data would be helpful to determine that it is one but not the other.

Attention is next directed to FIG. 3 of the drawings which shows received signals 31 and 32. There, the time measurements T1 and T2 are drawn to specific similar locations on the two wave forms. Assume that the error is present. This means that one cycle skip is represented by a time interval T. The reading T2 is then in error and this erroneous reading is represented by the symbol T2'. As will be observed in FIG. 3, this single cycle is a predictable duration because the single cycle period of the wave form is relatively well known. As will be understood, the acoustic transmitters are operated at known frequencies and the measured result is readily identified to be off by one cycle or an interval of T the period of the primary operating frequency. This is represented in the value of DTD by the symbol DTD'. In other words, DTD' is the minimum possible value with a single cycle skip error in it. As observed in the wave form of FIG. 3, this is given by Equation 8.

EQUATION 8:

$$DTD' = \tfrac{1}{2}T(1/Z)$$

The value of T is fairly well known in advance. Typical circumstances will yield a value of T of about 40 microseconds up to something around 60 microseconds. It is typical that the spacing Z is about two feet on most sondes. Plugging these values into Equation 8, DTD' is approximately equal to 40 over 2×2 or 10 microseconds per foot. Using this as a threshold value, if the DTD is less than approximately 10 microseconds per foot, then the cycle skip is likely to be zero. If the DTD value is this small, the confidence in the data is quite high.

Should the interval transit time be higher than DTD', it does not necessarily indicate that the data ought to be discarded. Rather, the data can be kept but evaluated with the view that some other cause has perhaps changed the data. DT(BHC) should be evaluated at this juncture to see whether or not there are wide ranging irregularities in caliper.

In FIG. 4 of the drawings, a flow chart is illustrated which includes a first step of making the measurements T1, T2, T3 and T4. With these measurements, computations are then made to determine DT for each of the two transmitters TR1 and TR2. In the single transmitter deployment, all the pulses may originate with the single transmitter but the calculations simply relate to the single transmitter and use the measurements shown in FIG. 2 instead of those from FIG. 1. Separately, DT(BHC) is computed. Likewise, a computing step determines DTD in accordance with the teachings found above. Lastly, DTD' is determined. These values are then input to a comparison step. Comparisons are made whereupon the output is then delivered to be stored as a function of depth. The outputs include DT of both transmitters, that is DT(TR1) and also DT(TR2), as well as compensated DT (i.e., DT(BHC)). All of this is stored for the purpose of illustrating a quality log adjacent to the DT values which are analyzed in evaluation of the acoustic log. The foregoing program is implemented through the use of a program with the typical general purpose computer as desired. The apparatus previously discussed in FIG. 1 prepares and formats the various time measurements and other data so that the calculations described with regard to the flow chart in FIG. 4 can then be carried out. While the foregoing is directed to the preferred embodiment, the scope is determined by the claims which follow.

What is claimed is:

1. In a sonde carrying an acoustic transmitter means for transmitting an acoustic pulse along a well borehole to an acoustic receiver wherein the transmitter and receiver are supported by the sonde in a well borehole, a method of improving the accuracy of an acoustic log comprising the steps of:
    (a) for a depth zone of interest, determining a first interval transit time measurement;
    (b) for the same depth zone, determining a second and independent interval transit time;
    (c) as a function of said first and second interval transit times, forming a difference signal; and
    (d) evaluating said difference signal relative to a specified determinant said determinant being a function of the time period of a primary frequency acoustic pulse for an indication of acoustic pulse cycle skipping in recognition of onset of received acoustic pulses at said acoustic receiver while correcting for any detected cycle skips.

2. The method of claim 1 wherein the foregoing procedure is conducted at a measurement depth in a well borehole and is repeated at other measurement depths along the borehole.

3. The method of claim 1 wherein an acoustic interval transit time is determined over a specified spacing between a pair of acoustic receivers carried by said sonde and the time of arrival of a transmitted acoustic pulse is contrasted between said pair of acoustic receivers.

4. The method of claim 1 including the step of determining an interval transit time as a function of velocity of the transmitted acoustic pulse.

5. The method of claim 1 wherein said time period is between about 40 microseconds and about 60 microseconds.

6. The method of claim 1 wherein the method is conducted by a sonde supporting a single transmitter and a pair of receivers thereon and wherein the sonde is positioned at three respective depth levels in a well borehole relative to a zone of interest, the three locations being:
    (1) wherein said transmitter is at the bottom of the zone of interest;
    (2) wherein the transmitter is at the top of the zone of interest; and
    (3) wherein the two receivers on the sonde are moved to locations corresponding to said first and second locations of the transmitter relative to the zone of interest.

7. The method of claim 1 wherein the zone of interest is acoustically tested by the sonde supporting two transmitters and two receivers thereon, the two receivers being located between the two transmitters by a specified distance, and wherein the two receivers are provided with separate transmitted pulses from each of the two transmitters to define four transmission paths, and the first and second independent acoustic interval transit times are determined from the four measurements, and wherein the acoustic pulses have the same period.

8. The method of claim 7 including the step of determining an interval transit time given by the relationship DT equals (T2−T1)(1/Z) where T1 and T2 equals travel times to the first and second receiver locations, and Z equals spacing between first and second receiver means locations.

9. The method of claim 8 wherein the determinant is given by the relationship DTD equals $\tfrac{1}{2}$T(1/Z) where T is the acoustic pulse period.

10. The method of claim 9 wherein DTD is less than about 10 microseconds/foot indicative of no cycle skipping.

11. The method of claim 9 wherein the difference signal exceeds about 10 microseconds/foot to indicate one or more possible skipped cycles.

12. The method of claim 1 including the step of determining borehole compensated DT as a function of the first and second interval transit times.

* * * * *